United States Patent Office 3,595,975
Patented July 27, 1971

3,595,975
DISINFECTING COMPOSITIONS
Claude Gauvreau, Ville la Salle, Quebec, Canada, assignor to Holliston Laboratories, Inc., Boston, Mass.
No Drawing. Continuation of application Ser. No. 500,225, Oct. 21, 1965. This application July 29, 1969, Ser. No. 854,009
Int. Cl. A01n 9/22
U.S. Cl. 424—263                    21 Claims

ABSTRACT OF THE DISCLOSURE

This invention relates to antiseptic compositions for inhibiting the growth of micro-organisms. More particularly, the invention relates to such compositions having high activity in that their phenol coefficients are large, including as one active constituent a halide salt of cetyl pyridinium and as a second active constituent a member of the group of organic compounds all having ten carbon atoms consisting of the terpenes and their oxygenated derivatives.

---

This application is a continuation of U.S. patent application Ser. No. 500,225, filed Oct. 21, 1965 (now abandoned), which patent application is a continuation of U.S. patent application Ser. No. 179,778, filed Mar. 14, 1962 (now abandoned).

I have discovered that the halogen salts of cetyl pyridinium, particularly the chloride and the bromide salts thereof, in admixture with a member of the group of isoprenoid compounds consisting of the monocyclic, bicyclic and acyclic monoterpene hydrocarbons and their alcohols, aldehydes, ketones, and other oxygenated derivatives, are synergistic with each other and greatly augment and improve upon the specific antimicrobial properties attributable to the separate constituents. Relatively dilute solutions of the salt and of the monoterpene compound, each present in a concentration of the order of a few parts per million, are efficaceous as disinfectants and for inhibiting the growth of a wide range of micro-organisms for example, from 2 to 50 parts per million of the salt and from 5 to 100 parts per million of the monoterpene.

The control of fungal growth presents a serious problem in many industries, institutions, and in medicine. In addition, control of bacteria, algae and other microscopic forms of animal and plant life is important. Means for inhibiting the growth of micro-organisms have hitherto been only partly successful. While numerous substances have been shown to have anti-microbial properties, the disadvantages of many of these limit their usefulness; for example, they may be truly effective only when used in such heavy concentrations that they are uneconomical, hazardous, or toxic.

The substance phenol, also known as phenol hydrate and carbolic acid, has been one of the most widely used disinfectant substances. Because it is adsorbed by intact skin, by wound tissue, and by mucous membranes, its usefulness is limited to such dilute concentrations that its anti-microbial activity is necessarily reduced. The toxicity and adverse side effects of the substance are well recognized.

Nevertheless, phenol is a widely adopted and useful standard against which the relative potencies of other compounds are measured. Hence in the present disclosure the term "phenol coefficient" or as abbreviated, the PC factor of the substance compared, is the unit of measure by which is indicated the relative weight of the substance in solution by comparison with the phenol concentration required to exercise the same degree of growth-inhibiting activity against a given species of micro-organism under the same conditions of testing.

The anti-microbial properties of cetyl pyridinium halogen salts, per se, have been recognized heretofore, the chloride salt having been shown to be antiseptic, as by Sarber, J. Pharmacol. 74, 277 1942. Anti-fungal properties of the bromide have been employed in a medication proposed by Ingmar Mansson, Medlemsblad For Sveriges Veterinarforbund, nr. 10/1959.

Citral, which is a relatively common terpene aldehyde found in the volatile oil of lemon, lemon grass, and orange, has long been known and widely used as a flavoring agent in foods and beverages. Recent findings of its bactericidal and anti-fungal properties are published by Zibister, D.E. in Russian publication Zh. Mikrob. Epid. i Immunobiol. 7, 15–18 1960. The germicidal efficacy of a few other aromatic oils has been indicated in papers such as that of Mose, J. R. and lukes, G., Arzneimittel Forsch 7, 687–92 1957.

The principal object of the present invention is to provide disinfecting compositions utilizing a synergisation effect manifested by admixtures of cetyl pyridinium halide and a monoterpene, whereby solutions, sprays, ointments, lotions, and other forms of medications and disinfectants may be realized with high anti-microbial activity at relatively low cost, and having relatively low toxic effects at the highest concentrations required for destruction of a wide range of micro-organisms.

The second constituent substance of an antiseptic composition according to my invention may be chosen from among a relatively large group of organic compounds having structures containing the repeating isoprene structural pattern, which are classed as terpenes and generally designated $C_{10}H_{16}$, and their oxygenated derivatives generally designated $C_{10}H_{16}O$ and $C_{10}H_{18}O$. The class includes the terpene hydrocarbon compounds m-cymene and p-cymene, $C_{10}H_{14}$, and among the oxygenated derivatives are included the compounds numerically designated $C_{10}H_{14}O$, $C_{10}H_{14}O_2$, $C_{10}H_{20}O$, and $C_{10}H_{20}O.H_2O$.

The monoterpenes have been defined succinctly in the chemical arts; see textbook "Organic Chemistry" by Fieser and Fieser, published by C. C. Heath and Company, Boston, U.S.A. Among the acyclic forms of the class are: myrcene; ocimene; the isomers of citral—neral and geranial; citronellal; nerol; geraniol; citronellol; and linalool. The monocyclic monoterpenes consist of: p-cymene; limonene; terpinolene; phellandrene; terpinol; terpineol; menthol; thymol; piperitol; isopulegol; carvacrol; carvomenthol; carveol; perillaldehyde; phellandral; menthone; pulegone; iso-pulegone; piperitone; carvomenthone; carvone; dihydrocarvone; carvotanacetone; diosphenol; cineole; ascaridole; m-cymene; and sylvestrene (carvestrene). Bicyclic monoterpenes consist of: thujene; sabinene; car- 3-ene and car-4-ene; minene; camphene; fenchene; thujyl alcohol; sabinol; thujone; umbellulone; carone; myrtenal; myrtenol; pinocamphone; pinocampheol; camphor; camphorquinone; borneol; fenchone; and fenchyl alcohol. Many of the foregoing compounds have stereo-isomer forms.

The anti-microbial activity of the halide salts of cetyl pyridinium in solution against a number of important pathogenic micro-organisms is set out in the accompanying Table I, wherein the relative phenol coefficients of the bromide and of the chloride salts are given for each microbial species. The unit values of the PC factor are expressed as the inverse of the relative weight of the salt in solution in parts per million (p.p.m.) required to secure the same inhibition of growth as is obtained by a phenol solution of the concentration indicated. Accordingly, a PC factor greater than unity will be understood to signify that the substance has an anti-microbial activity greater than that of phenol, or in other words that a greater amount of phenol would be required in the proportion indicated by the PC multiplying factor to obtain the same growth inhibiting effect on the micro-organism. All values were obtained by standardized tests involving the inoculation with microbial strains purchased from the American Type Culture Collection in Washington, D.C., U.S.A., of prepared culture media to which were added amounts of the substance to produce in each of a series of such culture media, specific graded concentrations.

I intend by the expression "inhibition of growth" to signify any discernible degree of diminution of growth or metabolism of a micro-organism, including complete cessation of life processes. In the foregoing tests, the lethal concentrations, as evidenced by absence of growth in a predetermined period of time after inoculation, were used in determining the PC factor.

The specific anti-microbial activity of the relatively common monoterpene citral, consisting of its geometric isomers neral and geranial, against a number of micro-organisms including the fungi and bacteria of Table I, is set out in Table II. The separate efficacies of phenol and of citral, indicated by the concentration of each at which growth is inhibited, establish the phenol coefficient of citral.

When the monoterpene aldehyde citral is admixed with a halide salt of cetyl pyridinium, the specific activity of the admixture in preventing or inhibiting growth of the fungi and bacteria previously tested is shown by Table III to be strikingly and inexplicably enhanced in all instances. In this table are listed the phenol coefficients of cetyl pyridinium bromide alone, of cetyl pyridinium chloride alone, of citral alone, and of the combinations of each halide salt with citral, wherein the citral concentrations respectively are 20 p.p.m. and 10 p.p.m. As will be immediately apparent, the admixture of the two ingredients produces an improvement in anti-microbial activity which in some cases is more than a thousand times that of either constituent alone. This clearly demonstrates that a strong synergistic potentiation is achieved. The anti-microbial potency is far greater than may be accounted for by merely summing the PC factors of the ingredients. That the enhancement is wholly the result of the synergisation of anti-microbial activity may be understood from a simple inspection of the data, which show a PC for the admixture which is a multiple of the aggregate of the separate PC factors. For example, the composition consisting of cetyl pyridinium bromide and citral has a synergized anti-microbial activity against *Candida albicans* wherein the PC factor is more than six times as large as the product of the individual PC factors of the separate constituents, and more than forty-seven times as large as their aggregate.

It will also be apparent that effective concentrations of the composition are low. The substance citral is itself a harmless food substance. The concentration of cetyl pyridinium bromide lethal to resistant micro-organisms such as *Staphylococcus auereus* ATCC #11631 in admixture with citral is so low that it might be ingested with complete safety. Tests carried out show that even enormously higher concentrations are relatively safe for animals as described by the following test.

Ten albino mice, both male and female, in good health and having a body weight of 20–22 grams were given their cutomary diet for a period of five weeks. To their diet was added, for five consecutive days of each week, a dose of 0.5 milligram of cetyl pyridinium bromide in 1 ml. of water, administered with oral syringe with oral needle.

Although the dialy weight ingested as a single dose amounts to 25 mg./kilo, no test animals died, lost weight, or showed observable symptoms.

It is inferred that the lethal dose in mice is not less than 75 mg./kilo.

The composition when appropriately formulated is clearly ideally suited to the treatment of infections by micro-organisms in animals, both on skin surfaces and on mucous membranes.

Monoterpenes chosen from the list given hereinabove when tested for synergism in combination with cetyl pyridinium halide salts, were found to produce excellent improvement of anti-microbial activity, in some instances the enhancement being superior to that obtained by combining citral with the salt. Table IV shows PC factors calculated when a fixed concentration of the monoterpene was admixed with amounts of cetyl pyridinium bromide increasing upwards from 0.0 p.p.m. and added to the culture media inoculated with the fungus Trichoderma sp. 9645, a causative organism for the ailment "athlete's foot."

This fungal micro-organism was selected in view of its relatively high resistance to phenol, and because its mode of growth in surface skin layers of the body presents a locale difficult of treatment by reason of absorption of phenol in intact surface tissue.

Table IV shows that whereas cetyl pyridinium bromide has a PC alone of 3.33 (Table III), each of thirteen monoterpene additives chosen at random out of the possible compounds embraced within the class of acyclic, monocyclic and bicyclic monoterpenes and their oxygenated derivatives, produced startlingly effective antiseptics and antifungal compositions with respect to the micro-organism. The random test included citronellal, citronellol, eucalyptol, fenchone, geraniol, linalool, menthol, nerol, p-cymene, pinene, pulegone, terpineol, and thymol, representing hydrocarbons, aldehydes, alcohols, ketones, and other oxygenated forms derived from monoterpene hydrocarbons. The PC values obtained ranged from 106.5 to 444, when 20 p.p.m. of the additive were employed. The concentration of cetyl pyridinium halide effective to control the fungus in no case exceeded 4 p.p.m.

Compositions formulated to combine a cetyl pyridinium halide and a monoterpene organic componud are ideally suited for topical application in the treatment of infections by micro-organisms and animals both on skin surfaces and on mucous membranes, when dissolved or dispersed in a suitable compatible carrier. An exceedingly large number of combinations are possible, depending on the mode of use intended, kind of vehicle in which the active ingredients are dissolved or suspended, and the nature of further additives which may be incorporated for therapeutic purposes. The ratio of concentrations of the halide salt and of the monoterpene may be varied widely, the latter preferably but not necessarily being present in somewhat greater concentration than the former. Effective ratios of the halide salt to the monoterpene, by weight, may range from about 1:3000 to about 300:1 for example 1:50 to 50:1. It will be understood that optimum ratios will lie generally intermediate the extremes of the range indicated, and the highest enhancement of anti-microbial activity will in most of the possible combinations be realized with the monoterpene present in the proportion of a small multiple of the weight of the halide salt.

Supplementing the active ingredients of the present invention (i.e., cetyl pyridinium halide and a monoterpene compound including oxygenated derivatives thereof), several other antibacterial agents such as antibiotics, sulfonamides, and combinations thereof may be admixed. Other active ingredients can be utilized in formulating compositions according to the present invention, for example anti-irritants, analgesics, and astringents. All such additive pharmaceuticals must be compatible with the active ingredients. While obviously destructive additives would not be added by those skilled in the chemical arts, the stability of the active ingredients cannot be assured unless no anionic substances are admixed. For example, non-ionic compounds and some cationic substances are compatible with the active ingredients, so that choices may generally be directed accordingly in selecting vehicles.

Some other additives which may be admixed in appropriate quantities in formulating compositions according to the invention include suspending agents such as propylene glycol, bases for ointments and lotions such as carbowax 4000 (a trademark of Union Carbide Corporation for polyethylene glycols), granulation vehicles such as ethyl alcohol and gelatin, emollients such as lanolin and paraffin, bulk carriers such as lactose and starch, and propellants such as inert gases.

Substances particularly effective to allay the inflammation attending infections may desirably be added to the disinfecting compositions for topical use, to promote healing while the invading micro-organisms are combated by the active ingredients. Steroids, specifically 17 β-hydroxycorticosterone and its therapeutically active derivatives are eminently suitable.

The following specific formulations are proposed to illustrate rather than to limit the practice of the invention and it will be apparent that ointments, jellies, creams, lotions, sprays, sanitizing and cleaning preparations, paints and waxes, and other forms of compositions may be varied extensively from the exact proportions given in the examples. It will be understood that the ingredients specified should be admixed in accordance with approved pharmaceutical techniques when formulated as medications.

It is moreover advisable to protect compositions from prolonged exposure to light and heat.

Antiseptic solution

Cetyl pyridinium bromide—10 mg.
Monoterpene hydrocarbon or oxygenated derivative (e.g. citral)—5 mg.
40% ethyl alcohol—100 ml.

The solution is protected from light and heat and is used full strength for antifungal and antibacterial control directly on skin and mucous surfaces, wounds, and in disinfecting articles and utensils, or it may be diluted with up to 10 times its volume of water.

Lotion

Carbowax 400—45 grams
Propylene glycol—15 ml.
Cetyl pyridinium bromide—10 mg.
Citral—5 mg.
Water up to 100 ml.

Ointment

Pariffin—40 parts
Lanolin—10 parts
Liquid paraffin—60 parts
Cetyl pyridinium bromide—1/50 part
Citral—1/100 part Compositions combining the anti-microbial activities of the active ingredients of the invention, with the antipruritic and anti-inflammatory properties of hydrocortisone are set out in the following exemplary embodiments.

Lotion

Carbowax 400: 45 grams
Propylene glycol: 15 ml.
Cetyl pyridinium bromide: 10 mg.
Citral: 5 mg.
Hydrocortisone: 0.5 gram
Water: up to 100 ml.

Ointment

Paraffin: 40 grams
Lanolin: 10 grams
Liquid paraffin: 60 grams
Cetyl pyridinium bromide: 20 mg.
Citral: 10 mg.
Hydrocortisone: 1 gram.

Room surfaces, as in houses, hospitals, and institutions may be sanitized by use of a detergent cleaning compound as indicated below, wherein the ingredients are present in the relative weight proportions indicated:

Detergent sanitizer

| | Percent |
|---|---|
| Non-ionic low foaming detergent | 10 |
| Cetyl pyridinium bromide | 2 |
| Citral | 1 |
| Water | 87 |

The above composition, diluted with water in the proportion of one pound per 200 to 250 pounds, provides a potent non-toxic antiseptic wash devoid of any objectionable smell.

Water solutions of the detergent sanitizer compound may be prepared in the strength of one pound per 100 pounds water, and applied to textiles, paper webs in paper mills, and printing rollers and blankets, by spraying or atomizing the solution.

When added to tanks in a proportion of from about 50 to about 200 parts per million, the sanitizer preparation above is effective for the control of slime-forming micro-organisms and algae. Stronger concentrations are well suited to treatment of foot baths in shower rooms.

TABLE I

| Micro-organism | Concentration of phenol for control, p.p.m. | Concentration of cetyl pyridinium chloride for control, p.p.m. | PC | Concentration of cetyl pyridinium bromide for control, p.p.m. | PC |
|---|---|---|---|---|---|
| Trichoderma sp. ATCC 9645 | 666 | >200 | >3.3 | 200 | 3.30 |
| Tricophyton meniagrophytes ATCC 9533 | 2,000 | 25 | 80 | 6.25 | 320. |
| Microsporum gypseum ATCC 10215 | 400 | >100 | <4 | | |
| Tricophyton meniagrophytes ATCC 11480 | 533 | 12.5 | 42.6 | 6.25 | 85.3 |
| Tritirachium purpureum ATCC 11385 | 666 | | | 100 | 6.660 |
| Microsporum audouni ATCC 11347 | 400 | | | 1.56 | 256.4 |
| Tricophyton tonsurans ATCC 10217 | 400 | | | 0.78 | 512.8 |
| Candida albicans | 4,000 | | | 200 | 20.0 |
| Staphylococcus aureus ATCC 6538 p-4 | 4,000 | | | 3.12 | 1,282.0 |
| Staphylococcus aureus ATCC 11631 | 4,000 | | | 50 | 80.0 |
| Proteus vulgaris ATCC 6380 | 4,000 | | | 900 | 4.4 |
| Shigella dysenteriae ATCC 11835 | 2,000 | | | 12.5 | 160.0 |
| Salmonella typhosa ATCC 6539 | 2,000 | | | 50 | 40.0 |
| Diplococcus pneumoniae ATCC 6303 | 1,000 | | | 12.5 | 80.0 |

Note.—P.p.m=parts per million, PC=phenol coefficient.

TABLE II

| Micro-organism | Concentration of phenol for control, p.p.m. | Concentration of citral (neral and geranial) for control, p.p.m. | PC of mixture |
|---|---|---|---|
| Trichoderma sp. ATCC 9645 | 666 | 333 | 2.0 |
| Tricophyton mentagrophytes ATTC 9533 | 2,000 | 333 | 6.0 |
| Microsporum gypseum ATTC 10215 | 400 | | |
| Tricophyton mentagrophytes ATCC 11480 | 533 | 83 | 6.42 |
| Tritirachium purpureum ATCC 11385 | 666 | 83 | 8.02 |
| Microsporum audouni ATCC 11347 | 400 | 20.8 | 19.61 |
| Tricophyton tonsurans ATCC 10217 | 400 | 20.8 | 19.61 |
| Candida albicans | 4,000 | 333 | 12.0 |
| Staphylococcus aureus ATCC 11631 | 4,000 | 666 | 6.0 |
| Staphylococcus Aureus ATCC 6538 p-4 | 4,000 | 333 | 12.0 |
| Proteus vulgaris ATCC 6380 | 4,000 | 666 | 6.0 |
| Shigella dysenteriae ATCC 11835 | 2,000 | 666 | 3.0 |
| Salmonella typhosa ATCC 6539 | 2,000 | 666 | 3.0 |
| Diplococcus pneumoniae ATCC 6303 | 1,000 | 333 | 3.0 |

TABLE III

| Micro-organism | Concentration of cetyl pyridinium chloride for control, when 20 p.p.m. terpene present (citral) | PC of mixture | Concentration of cetyl pyridinium bromide for control, when 10, 20 p.p.m. terpene present (citral) | | PC of mixtures | | PC of CPB alone | PC of citral alone |
|---|---|---|---|---|---|---|---|---|
| | | | 10 p.p.m. | 20 p.p.m. | 10 p.p.m. | 20 p.p.m. | | |
| Trichoderma sp. ATCC 9645 | 25 | 26.6 | 100 | 25 | 6.66 | 26.6 | 3.33 | 2.0 |
| Tricophyton mentagrophytes ATCC 95333 | 1.56 | 1,282 | 1.55 | 0.78 | 1,282 | 2,564 | 320 | 6.0 |
| Microsporum gypseum ATCC 10215 | 25 | 16 | 12.5 | 6.25 | 32 | 64 | | 9.6 |
| Tricophyton mentagrophytes ATCC 11480 | | | 0.38 | 0.38 | 1,366 | 1,366 | 85.2 | 6.4 |
| Microsporum audouni ATCC 11347 | | | 3.12 | 0.39 | 128.2 | 1,025 | 256.4 | 19.61 |
| Candida albicans | | | 12.5 | 3.12 | 320 | 1,282 | 20 | 12.0 |
| Staphylococcus aureus ATCC 11631 | | | ¹6.25 | ²3.12 | 640 | 1,280 | 80 | 6.0 |
| Shigella dysenteriae ATCC 11835 | | | 12.5 | 12.5 | 160 | 160 | 160 | 3.0 |

¹ 50 p.p.m. citral.
² 100 p.p.m. citral.

TABLE IV

[Fungal micro-organism—Trichoderma sp. ATCC 9645; phenol coefficient for cetyl pyridinium bromide—3.3]

| Monoterpene additive in culture, 20 p.p.m. of each | Days elapsed to commencement of growth in culture containing cetyl pyridinium bromide in concentration given | | | | | | PC for composition |
|---|---|---|---|---|---|---|---|
| | 6.25 p.p.m. | 3.15 p.p.m. | 1.5 p.p.m. | 0.78 p.p.m. | 0.36 p.p.m. | 0.0 p.p.m. | |
| Citronellal | — | — | — | 10 | 10 | 3 | 444 |
| Citronellol | — | 5 | 5 | 5 | 4 | 3 | 106.5 |
| Eucalyptol | — | 5 | 5 | 5 | 55 | 3 | 106.5 |
| Fenchone | — | — | — | 3 | 3 | 3 | 444 |
| Geraniol | — | — | — | 3 | 33 | 3 | 444 |
| Linalool | — | — | — | 3 | 3 | 3 | 444 |
| Menthol | — | — | 7 | 5 | 5 | 3 | 211.4 |
| Nerol | — | — | — | 6 | 3 | 3 | 444 |
| p-Cymene | — | — | 3 | 3 | 3 | 3 | 211.4 |
| Pinene | — | — | — | 5 | 3 | 3 | 444 |
| Pulegone | — | — | — | 5 | 3 | 3 | 444 |
| Terpineol | — | — | 5 | 5 | 3 | 3 | 211.4 |
| Thymol | — | — | — | 7 | 3 | 3 | 444 |

—Denotes no observable growth in 15 days.

I claim:

1. A composition of matter possessing synergised growth-inhibiting properties against bacteria and fungi consisting essentially of as active ingredients a halide salt of cetyl pyridinium and a monoterpene selected from the group consisting of citronellal, citronellol, eucalyptol, fenchone, geraniol, linalool, menthol, nerol, p-cymene, pinene, pulegone, terpineol, thymol and citral, the weights of said active ingredients having a ratio of between about 1:50 and 50:1.

2. A composition as claimed in claim 1 in aqueous solution.

3. A composition as claimed in claim 1 in an ethyl alcohol solution.

4. A composition as claimed in claim 1 which includes a carrier suitable for topical use on skin surfaces and on mucous membranes in which carrier the active ingredients are dispersed.

5. A composition as claimed in claim 1 wherein the active ingredients comprise from about 2 to 50 parts per million of the halide salt and from about 5 to about 100 parts per million of the monoterpene.

6. A composition as claimed in claim 1 which includes hydrocortisone.

7. A composition as claimed in claim 1 wherein said halide salt of cetyl pyridinium is cetyl pyridinium bromide.

8. A composition of matter possessing synergised growth-inhibiting properties against bacteria and fungi consisting essentially of as active ingredients citral and a halide salt of cetyl pyridinium selected from the group consisting of the chloride and bromide salts, the weights of said active ingredients having a ratio of between about 1:50 and 50:1.

9. A composition as claimed in claim 1 which includes propylene glycol.

10. A composition as claimed in claim 8 for use as a suppository, which composition includes polyethylene glycol as a base and hydrocortisone.

11. A composition as claimed in claim 8 for use as a lotion or ointment which includes lanolin and paraffin as emollients and hydrocortisone.

12. A composition of matter possessing growth-inhibiting properties against bacteria and fungi consisting essentially of as active ingredients a halide salt of a cetyl pyridinium and a member selected from the group of isoprenoid compounds consisting of the monocyclic, bicyclic and acyclic monoterpene hydrocarbons and their alcohols, aldehydes, ketones and other oxygenated derivatives which contain the repeating isoprene structural pattern and are represented by the formulas: $C_{10}H_{16}$, $C_{10}H_{16}O$, $C_{10}H_{18}O$, $C_{10}H_{14}$, $C_{10}H_{14}O$, $C_{10}H_{14}O_2$, $C_{10}H_{20}O$, $C_{10}H_{20}O \cdot H_2O$, the weight of said active ingredients having a ratio of between about 1:50 and 50:1.

13. A composition as claimed in claim 12 which includes hydrocortisone.

14. The composition of matter as claimed in claim 12 wherein the halide salt of the cetyl pyridinium is selected from the group consisting of the chloride and bromide salts.

15. A method of inhibiting the growth of bacteria and fungi which method comprises:
bacteria and fungi with a growth-inhibiting amount of the composition consisting essentially of, as active ingredients, a halide salt of cetyl pyridinium and a member selected from the group of monoterpenes consisting of citronellal, citronello, eucalyptol, fenchone, geraniol, linalool, menthol, nerol, p-cymene, pinene, pulegone, terpineol, thymol and citral, and combinations thereof, the weights of said active ingredients having a ratio of between about 1:50 and 50:1.

16. A method as claimed in claim 15 wherein the growth-inhibiting amount includes from about 2 to 50 parts per million of the halide salt and from about 5 to 100 parts per million of the monoterpene.

17. A method of inhibiting the growth of bacteria and fungi which method comprises contacting the bacteria and fungi with a growth-inhibiting amount of a composition consisting essentially of as active ingredients citral and a halde salt of cetyl pyridinium selected from the group consisting of the chloride and bromide salts, the weights of said active ingredients having a ratio of between about 1:50 and 50:1.

18. A method as claimed in claim 15 wherein the bacteria and fungi are selected from a group consisting of trichoderma, *Tricophyton mentagrophytes, Microsporum gypseum, Tricophyton mentagrophytes, Tritirachium purpureum, Microsporum audouni, Tricophyton tonsurans, Candida albicans, Staphylococcus aureus, Proteus vulgaris, Shigella dysenteriae, Salmonella typhosa* and *Diplococcus pneumoniae.*

19. A method as claimed in claim 15 where the contacting of the bacteria and fungi is by spraying a solution of the composition.

20. A method as claimed in claim 15 wherein the composition includes hydrocortisone.

21. A method as claimed in claim 15 wherein the composition includes propylene glycol.

References Cited

Chem Abst. (I), 47: 10618i (1953).
Chem. Abst (II), 49: 11091f (1955).
Protef, Modern Drugs, 8th ed., (1961) p. 1037.
Merck Index, 7th ed., (1960), pp. 227 and 130.

STANLEY J. FRIEDMAN, Primary Examiner